(12) United States Patent
Kish

(10) Patent No.: US 7,481,396 B2
(45) Date of Patent: *Jan. 27, 2009

(54) SMALL-SIZE HIGH-SPEED TRANSMISSION SYSTEM FOR USE IN MICROTURBINE-POWERED AIRCRAFT

(75) Inventor: Jules G. Kish, Milford, CT (US)

(73) Assignee: Locust, USA, Inc., Miami, FL (US)

( * ) Notice: Subject to any disclaimer, the term of this patent is extended or adjusted under 35 U.S.C. 154(b) by 153 days.

This patent is subject to a terminal disclaimer.

(21) Appl. No.: 11/398,375

(22) Filed: Jun. 14, 2006

(65) Prior Publication Data

US 2007/0051846 A1 Mar. 8, 2007

Related U.S. Application Data

(63) Continuation of application No. 10/756,024, filed on Jan. 12, 2004, now Pat. No. 7,270,296.

(51) Int. Cl.
*B64C 35/00* (2006.01)
(52) U.S. Cl. ........................................ 244/60
(58) Field of Classification Search .............. 244/17.11, 244/60; 74/665 A, 665 B, DIG. 5
See application file for complete search history.

(56) References Cited

U.S. PATENT DOCUMENTS 3,351,304 A 11/1967 Wolfgang et al.

(Continued)

OTHER PUBLICATIONS

Selecting the Best Reduction Gear Concept for Prop-Fan Propulsion systems; J. Godston (Pratt & Witney Aircraft) and J. Kish (Sikorsky Aircraft); AIAA/SAE/ASME 18th Joint Propulsion Conference, Jun. 1982, Cleveland OH.

(Continued)

*Primary Examiner*—Tien Dinh
(74) *Attorney, Agent, or Firm*—Gordon & Jacobson, PC

(57) ABSTRACT

A transmission system that is used in conjunction with a microturbine engine for propelling an aircraft body, such as a propeller-based fixed-wing aircraft or a rotor-based vertical lift aircraft, or for a wide variety of other applications. The output shaft of the microturbine engine preferably operates at a rotational speed in a range between 72,000 RPM and 150,000 RPM with an output power between 150 HP and 5 HP (and most preferably operates in an extended range between 50,000 RPM and 200,000 RPM with an output power between 200 HP and 5 HP). The two reduction stages provide a reduction ratio preferably having a value of at least 19, and most preferably greater than 24. The transmission system is of small-size preferably having a maximum diameter less than twelve inches. The two stages of the transmission system may comprise any one (or parts of) a number of configurations, including an in-line lay shaft configuration, an in-line star-star configuration, an offset star-spur configuration, an offset compound idler configuration, an inline traction-internal gear configuration, and an inline traction-planetary gear configuration. Preferably, the input stage of the transmission system is self-equilibrating such that first shaft can be supported without bearings and is operably coupled to the output shaft of the microturbine engine by an outside diameter piloted spline coupling mechanism. For vertical lift applications, a single traction stage along with a bevel gear assembly or other shaft transmission mechanism can be used to provide the necessary RPM reduction.

22 Claims, 10 Drawing Sheets

U.S. PATENT DOCUMENTS

| | | | |
|---|---|---|---|
| 3,540,311 | A | 11/1970 | Chillson |
| 3,954,029 | A | 5/1976 | Wood |
| 4,177,693 | A | 12/1979 | Ivanko et al. |
| 4,301,981 | A | 11/1981 | Hartt |
| 4,468,985 | A | 9/1984 | Nilsson |
| 4,484,491 | A | 11/1984 | Cocking |
| 4,590,820 | A | 5/1986 | Hambric |
| 4,649,307 | A | 3/1987 | Bech |
| 4,817,382 | A | 4/1989 | Rudolph et al. |
| 4,856,377 | A | 8/1989 | Goudreau et al. |
| 5,108,043 | A | 4/1992 | Canavespe |
| 5,149,311 | A | 9/1992 | Luijten |
| 5,271,295 | A | 12/1993 | Marnot |
| 5,572,910 | A | 11/1996 | Tomaselli et al. |
| 5,727,378 | A | 3/1998 | Seymour |
| 5,782,433 | A | 7/1998 | Goi et al. |
| 5,875,690 | A | 3/1999 | Cognigni et al. |
| 5,932,940 | A | 8/1999 | Epstein et al. |
| 6,246,138 | B1 | 6/2001 | Nims |
| 6,264,138 | B1 | 7/2001 | Hawkins |
| 6,302,356 | B1 | 10/2001 | Hawkins |
| 6,612,195 | B2 | 9/2003 | Gmirya et al. |
| 6,676,073 | B2 | 1/2004 | Thomassey |
| 2005/0121916 | A1 | 6/2005 | Olsen et al. |

OTHER PUBLICATIONS

Internet Article on "Miniature UAV's and MAVs"; In the Public Domain; vol. 1.2.0/14 of 16/01 Jan. 03/gvgoebel@earthlink.net/public domain.

High Reduction Ratio Drive System for Small Unmanned Aerial Vehicle (UAV); SBIR Solicitation A-02-073, dated 2002, available at www.acq.osd.mil/sadbu/sbir/solicitations/sbir022/army022.htm.

High Reduction Ratio Drive System for Small Unmanned Aerial Vehicle (UAV); SBIR Program Proposal, dated Aug. 13, 2002, by Locust, USA, Inc.

2001 Cummins Power Generation, Microturbine Generator Set product description Model GTAB 50/60 Hz.

Sandia National Laboratories News Release, "New Sandia microtransmission vastly increases power of microengine" Nov. 21, 1997.

Bowman Power, Bowman Microturbine, Jul. 2002, http://www.energysolutionscenter.org/distgen/AppGuide/Manf/Bowman.htm.

$\Sigma Fv=0$
$Wr - Wr\sin 30 - Wt\cos 30 - Wr\sin 30 + Wt\cos 30 = 0$
$\Sigma Fh=0$
$Wt + Wr\cos 30 - Wt\sin 30 - Wr\cos 30 - Wt\sin 30 = 0$
NO RESULTANT LOADS $\Sigma Fv=0$
$Wr - Wr = 0$
$\Sigma Fh=0$
$Wt - Wt = 0$
NO RESULTANT LOADS

SMALL-SIZE HIGH-SPEED TRANSMISSION SYSTEM FOR USE IN MICROTURBINE-POWERED AIRCRAFT

This Application is a continuation of application Ser. No. 10/756,024, filed on Jan. 12, 2004 now U.S. Pat. No. 7,270,296.

BACKGROUND OF THE INVENTION

1. Field of the Invention

This invention relates broadly to the speed reduction systems for transmission of power from a gas turbine engine to a rotating drive element of an aircraft. More particularly, this invention relates to speed reduction systems for transmission of power from a small-size high-speed gas turbine engine to a slower-speed rotating drive element of an aircraft.

2. State of the Art

Small low-cost unmanned air vehicles (UAV's) have been developed and deployed to carry out a variety of military roles such as reconnaissance and attack missions. Currently, intermittent combustion piston engines of 100 HP (or less) power all of the low speed UAV aircraft. Most of these engines drive propellers without the need for a gearbox. However, these engines burn gasoline, which is highly flammable and thus undesirable for field service operations. Piston engines also have undesirable vibration characteristics and are difficult to start in cold weather operations.

SUMMARY OF THE INVENTION

It is therefore an object of the invention to provide an improved lightweight and small-sized propulsion system suitable for use in a UAV.

It is another object of the invention to provide an improved lightweight and small-sized propulsion system which consumes fuel of low flammability, such as JP-8 fuel.

It is yet another object of the invention to provide a lightweight and small-sized propulsion system with improved vibration characteristics.

It is still another object of the invention to provide a lightweight and small-sized propulsion system with improved starting capabilities in cold weather operations.

It is another object of the invention to provide a small and lightweight transmission system that is suitable for use with a high speed microturbine to provide the necessary RPM reduction for aircraft propulsion applications.

It is another object of the invention to provide such a transmission system that is suitable for use with a microturbine whose output shaft is operating in a range between 72,000 RPM and 150,000 RPM with an output power between 150 HP and 5 HP, and preferably operating in an extended range between 50,000 RPM and 200,000 RPM with an output power between 200 HP and 5 HP.

It is a further object of the invention to provide such a transmission system that provides a reduction ratio of at least 19 and preferably greater than 24, which is suitable for UAV aircraft applications.

It is a further object of the invention to provide such a transmission system whose maximum diameter is less than 12 inches.

It is still another object of the invention to provide such a transmission system that avoids bearings for supporting the input shaft of the transmission system.

In accord with these objects, which will be discussed in detail below, an unmanned air vehicle (UAV) is provided which uses a microturbine engine for propelling an aircraft via a transmission system (or for a wide variety of other applications). The transmission system has a first shaft operably coupled to an output shaft of the microturbine engine, which may operate at a rotational speed in a range of between 72,000 RPM and 150,000 RPM with an output power between 150 HP and 5 HP (and preferably operates in an extended range between 50,000 RPM and 200,000 RPM with an output power between 200 HP and 5 HP). Two reduction stages drive a second shaft at a reduced rotation speed with respect to the first shaft. The two reduction stages provide a reduction ratio preferably having a value of at least 19, and most preferably greater than 24. The transmission system is of small-size preferably having a maximum diameter less than twelve inches. The second shaft of the transmission system is operably coupled to a propeller for propelling an aircraft body, such as a fixed-wing aircraft body. The two stages of the transmission system may comprise any one (or parts of) of a number of configurations, including an in-line lay shaft configuration, an in-line star-star configuration an offset star-spur configuration, an offset compound idler configuration an inline traction-internal gear configuration and an inline traction-planetary gear configuration.

According to one embodiment of the invention, the input stage of the transmission system (and propulsion systems based thereon) is self-equilibrating such that first shaft can be supported without bearings.

According to another embodiment of the invention, an outside diameter piloted spline coupling mechanism couples the output shaft of the microturbine engine to the first shaft of the transmission system.

According to another embodiment of the invention, a single traction stage along with a bevel gear assembly or other shaft transmission means can be used to provide the necessary RPM reduction between the output of the microturbine engine and the rotor of a vertical lift aircraft.

Additional objects and advantages of the invention will become apparent to those skilled in the art upon reference to the detailed description taken in conjunction with the provided figures.

DETAILED DESCRIPTION OF THE PREFERRED EMBODIMENTS

Recently, small-size turbine engines (referred to herein as "microturbines") have been developed primarily for the radio control model airplane market. An example of such a microturbine engine is disclosed in detail in U.S. Pat. No. 5,727,378 to Seymour. Such microturbines, when used in conjunction with heavy jet fuel (such as JP-8 fuel) provide a highly advantageous propulsion system for small, low-cost UAVs. The advantages afforded by such microturbines include lighter weight, use of less flammable fuels, higher reliability and reduced vibrations.

However, microturbines operate at very high rotational speeds, typically in the range between 72,000 RPM and 150,000 RPM with an output power between 150 HP and 5 HP. Such rotational speeds and output power may extend to a range between 50,000 RPM and 200,000 RPM with an output power between 200 HP and 5 HP. UAV aircraft operate at much slower propeller rotational speeds, typically on the order of 3700 RPM to 4500 RPM. These constraints result in a required reduction ratio from the typical microturbine engine RPM to the propeller RPM on order of 28:1 to 24:1.

Because of the high output speeds of the microturbine (which is 2.5 to 10 times higher that current state of the art production turbine engines), current transmission designs for turbine engines do not provide the necessary RPM reduction, nor do such designs integrate the necessary RPM reduction functionality into a low-cost, small and lightweight design that is suitable for use in UAVs.

Figure 1A:
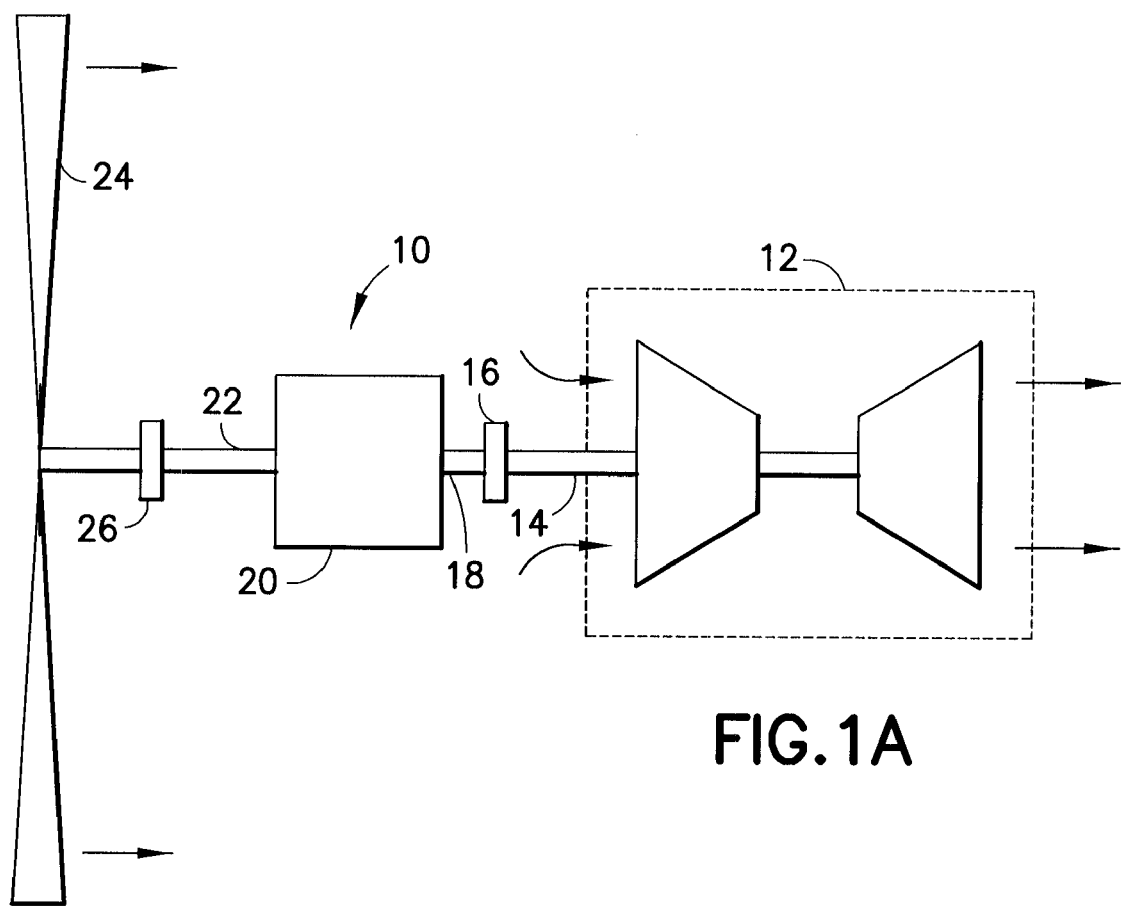
FIG. 1A is a schematic diagram of a propeller-based propulsion system, including a microturbine engine and transmission system in accordance with the present invention
Figure 1B:
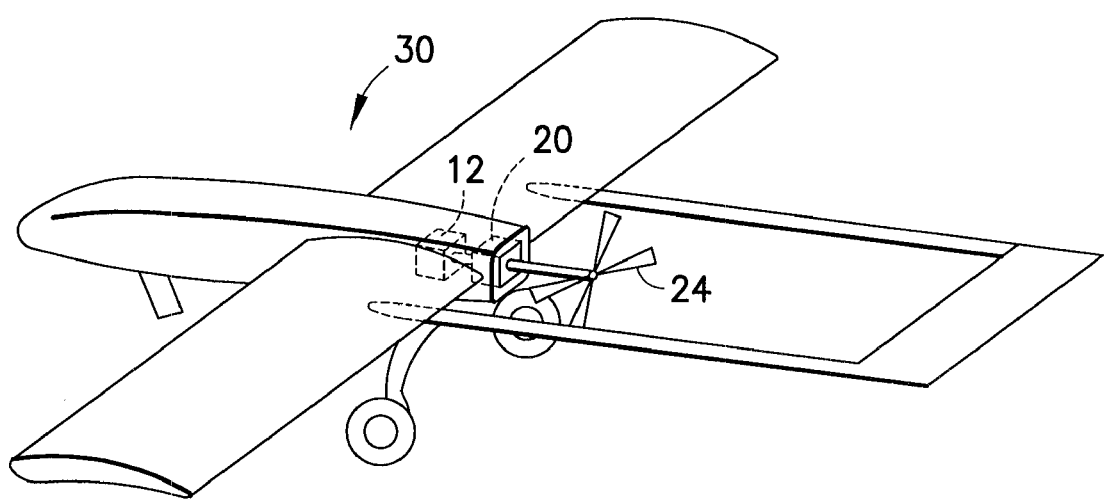
FIG. 1B is a pictorial illustration of an exemplary fixed-wing UAV that employs the propeller-based propulsion system of FIG. 1A in accordance with the present invention.

Turning now to FIG. 1A, there is shown a power plant 10 suitable for use in propelling a fixed-wing aircraft, such as an unmanned fixed-wing aircraft 30 shown in FIG. 1B. The power plant 10 includes a microturbine engine 12 with an output shaft 14. A coupling mechanism 16 couples the output shaft 14 to the input shaft 18 of a transmission system 20. The transmission system 20 operates to reduce the speed of the output shaft 14 of the microturbine engine 12 at its own output shaft 22. The output shaft 22 of the transmission system is coupled to a propeller 24 by a coupling mechanism 26. The propeller 24, when driven by the microturbine engine 12 and transmission system 20, provides thrust that propels an aircraft body, such as the body of the fixed-wing aircraft 30 of FIG. 1B. Note that in the configuration shown, the transmission system 20 and propeller 24 are disposed on the intake side of the microturbine engine 12. This configuration allows the transmission system to be cooled by the engine inlet air. Alternatively, the transmission system 20 and propeller 24 may be disposed on the exhaust side of the microturbine engine 12. In this alternate configuration, the transmission system and propeller must operate in a hot environment, and thus must be designed to endure the increased thermal loading that stems from operation in the hot environment on the exhaust side of the engine 12.

The output shaft 14 of the microturbine 12 operates at very high rotational speeds, typically in the range between 72,000 RPM and 150,000 RPM with an output power between 150 HP and 5 HP. For low-speed UAV applications, the propeller 24 operates at much slower rotational speeds, typically on the order of 3700 RPM to 4500 RPM. These constraints result in a required reduction ratio from the microturbine engine RPM to the propeller RPM on the order of 28:1 to 24:1. The transmission system 20 provides this required speed reduction over the output power range (150 HP to 5 HP) of the microturbine engine.

In the preferred embodiment of the present invention, the transmission system 20 as well as the microturbine engine are of small size and low weight. Preferably, the maximum diameter of the transmission system is less than 12 inches. Such size and weight constraints are suitable for use in advanced UAVs. Moreover, the transmission system 20 is preferably realized by a two-stage design. There are many different two-stage designs that can be used to realize the transmission system 20 as described below with respect to FIGS. 2-8.

Figure 2:
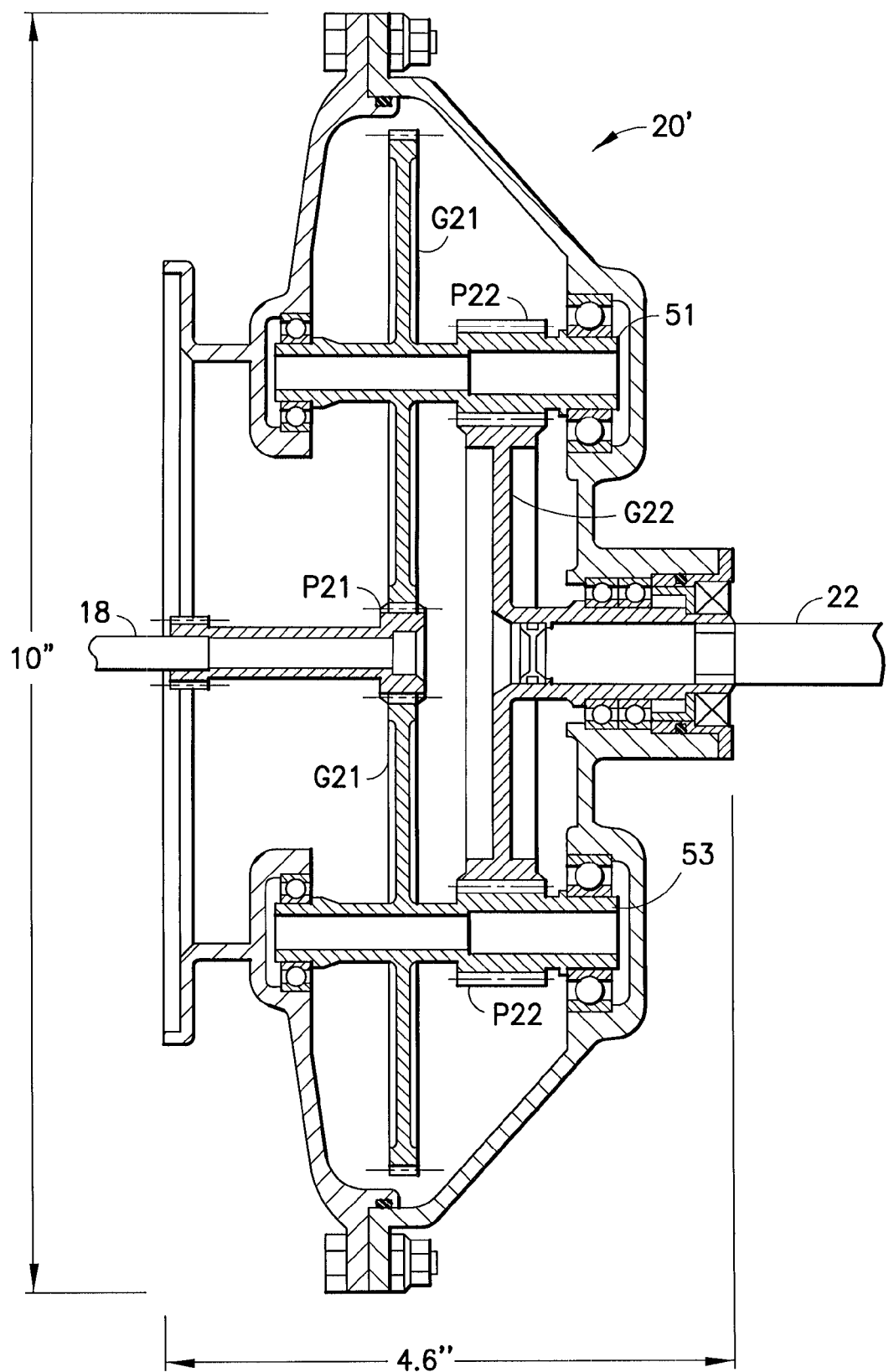
FIG. 2 is a cross-section depicting a first illustrative embodiment of the transmission system of FIG. 1A, which is realized by a two stage in-line lay shaft configuration

FIG. 2 illustrates a first exemplary embodiment of the transmission system 20 of FIG. 1. The two-stage transmission system, which is labeled 20', is an In-line Lay Shaft configuration. The first reduction stage is provided by a pinion P21 integral to the input shaft 18 and two gears (each labeled G21) that are spaced 180 degrees apart. The radial centerline joining the pinion P21 and two gears G21 can be in any clock orientation, but is preferably disposed in a horizontal orientation to make lubrication easier. The second stage includes two pinions P22 (which are integral to the two intermediate shafts 51, 53 that include the two gears G21 of the first stage) and one gear G22 that is affixed to an output shaft. The two pinions P22 of the second stage are spaced 180 degrees apart. Since, the gearing forms a "closed-loop", there must be a certain tooth relationship between the gears and pinions of the two stages so that the transmission system can be assembled and rotate without interference. The two intermediate shafts 51 and 53, and the spline coupled to the output shaft 22 are supported by bearings as shown.

The reduction ratio of the In-Line Lay Shaft configuration of FIG. 2 is provided by:

$$\frac{D_{G21}}{D_{P21}} \frac{D_{G22}}{D_{P22}},$$

where $D_{G21}$ and $D_{P21}$ are the diameters of the pitch circle for the teeth of the gears G21 and pinion P21 of the first stage, and $D_{G22}$ and $D_{P22}$ are the diameters of the pitch circle for the teeth of the gear G22 and the pinions P22 of the second stage.

Alternatively, the reduction ratio of the In-Line Lay Shaft configuration of FIG. 2 is provided by:

$$\frac{N_{G21}}{N_{P21}} \frac{N_{G22}}{N_{P22}},$$

where $N_{G21}$, $N_{P21}$, $N_{G22}$, $N_{P22}$ are the number of teeth along the pitch circle of the respective pinions and gears.

In the exemplary configuration shown, the diameters $D_{G21}$ and $D_{P21}$ are 3.731 inches and 0.692 inches, respectively, and the teeth counts $N_{G21}$ and $N_{P21}$ are 97 and 18, respectively. These values provide a reduction ratio of the first stage on the order of 5.4. Moreover, the diameters $D_{G22}$ and $D_{P22}$ are 3.638 inches and 0.785 inches, respectively, and the teeth counts $N_{G22}$ and $N_{P22}$ are 88 and 18, respectively. These values provide a reduction ratio of the second stage on the order of 4.6. The reduction ratio of the transmission system 20' is the product of these two reduction values, which is (5.4*4.6):1 and thus on the order of 25:1. With the input shaft 18 rotating at about 104,600 RPM with a power on the order of 70 HP, the two intermediate shafts 51,53 are rotating at about 19,410 RPM, and the output shaft 22 is rotating at about 4,191 RPM, which is a value suitable for driving a propeller of a small propeller-driven fixed-wing UAV.

Note that the largest diameter of the configuration of FIG. 2 is formed by the first reduction stage, which is dictated by the outside diameters of the two gears G21 and the pinion P21. In the configuration shown, this sum is provided by (2*3.731 inches)+0.692 inches, which is on the order of 9 inches in diameter. The housing requires an additional inch, thus the largest diameter of the transmission system 20" is on the order of 10 inches. The width of the transmission system 20' is on the order of 4.6 inches as shown.

Figure 3:
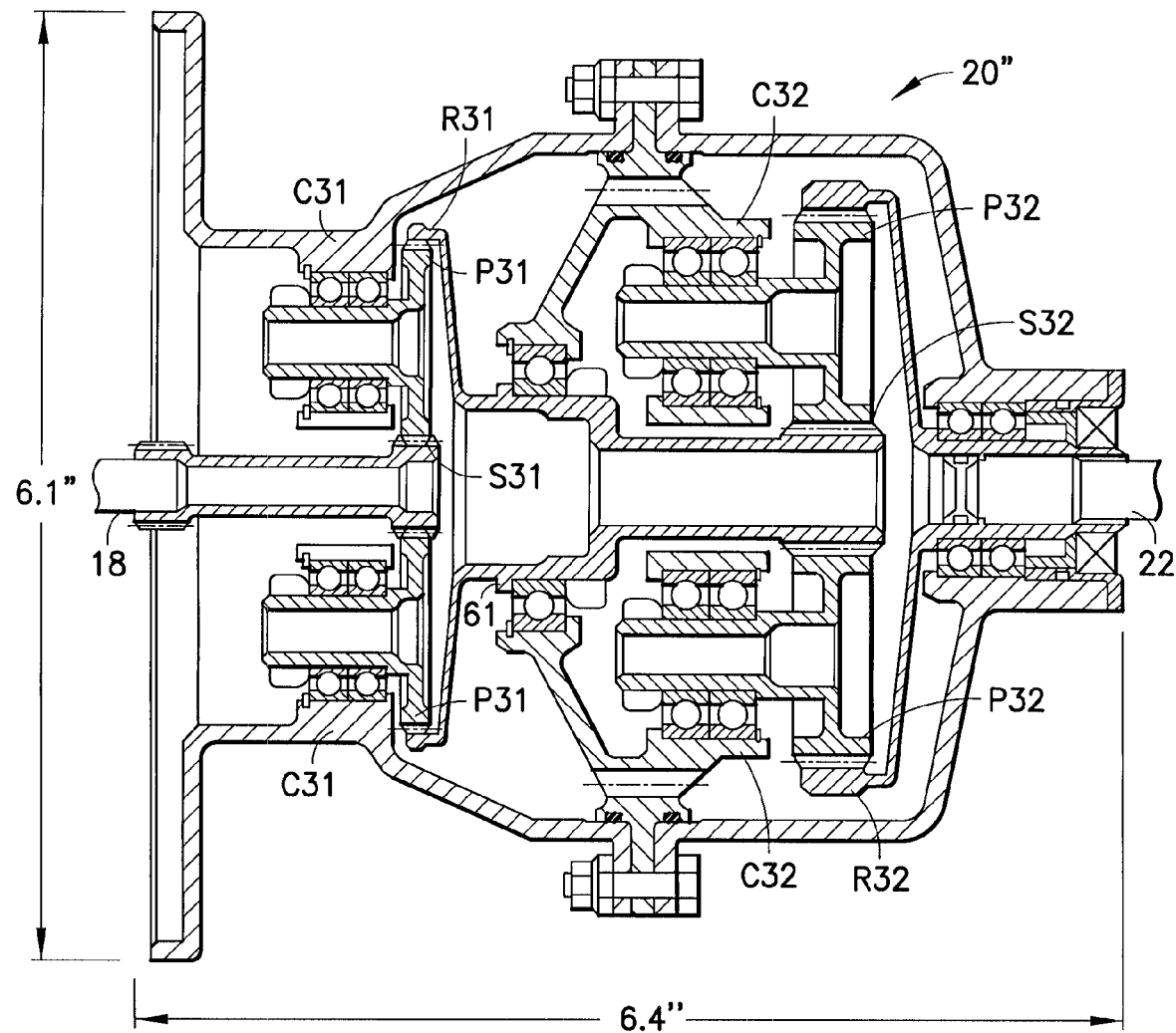
FIG. 3 is a cross-section depicting a second illustrative embodiment of the transmission system of FIG. 1A, which is realized by a two stage in-line star-star configuration.

FIG. 3 illustrates a second exemplary embodiment of the transmission system 20 of FIG. 1. The two-stage transmission system, which is labeled 20", is an In-line Star-Star configuration. The first stage is provided by a star planetary system having a sun gear S31, a plurality of planetary pinions (labeled P31), a fixed carrier C31 operably coupled to the planetary pinions P31, and an output ring gear R31. Similarly, the second reduction stage is provided by a star planetary system having a sun gear S32, a plurality of planetary pinions P32, a fixed carrier C32 operably coupled to the planetary pinions P32, and an output ring gear R32. The input shaft of the transmission system is affixed to the sun gear S31 of the first reduction stage. The output ring gear R31 of the first reduction stage is operably coupled to an intermediate shaft 61 with the sun gear S32 of the second stage affixed thereto. The output ring gear R32 of the second stage is operably coupled to the output shaft 22 of the system 20". The pinions P31 of the first stage, the intermediate shaft 61, the pinions P32 of the second stage, and the spline coupled to the output shaft 22 are supported by bearings as shown.

The reduction ratio of the In-Line Star-Star configuration of FIG. 3 is provided by:

$$\frac{N_{R31}}{N_{S31}} \frac{N_{R32}}{N_{S32}},$$

where $N_{R31}$, $N_{S31}$, $N_{R32}$, $N_{S32}$ are the number of teeth along the pitch circle of the respective ring gears and sun gears of the two stages.

In the exemplary configuration shown, the diameters $D_{S31}$, $D_{P31}$ and $D_{R31}$ of the first stage gears are 0.594 inches, 1,281 inches and 3.156 inches, respectively, and the teeth counts $N_{S31}$, $N_{P31}$ and $N_{R31}$ of the first stage gears are 19, 41, and 101, respectively. These values provide a reduction ratio of the first stage on the order of 5.3. Moreover, the diameters $D_{S32}$, $D_{P32}$ and $D_{R32}$ of the second stage gears are 0.769 inches, 1.423 inches and 3.615 inches, respectively, and the teeth counts $N_{S32}$, $N_{P32}$ and $N_{R32}$ of the second stage gears are 20, 37, and 94 respectively. These values provide a reduction ratio of the second stage on the order of 4.7. The reduction ratio of the system 20" is the product of these two reduction values, which is (5.3*4.7):1 and thus on the order of 25:1. With the input shaft 18 rotating at about 104,600 RPM with a power on the order of 70 HP, the intermediate shaft 61 is rotating at about 19,677 RPM, and the output shaft is rotating at about 4,187 RPM, which is a value suitable for driving the propeller of a small propeller-driven fixed-wing UAV.

Note that the largest diameter of the configuration of FIG. 3 is formed by the second stage, which is dictated by the outside diameter of the ring gear R32 of the second stage. In the configuration shown, this dimension is on the order of 3.6 inches in diameter. The housing requires a few additional inches in diameter, thus the largest diameter of the transmission system 20" is on the order of 6 inches. The width of the transmission system 20" is on the order of 6.4 inches as shown.

Note that it is desirable that the star planetary systems of the first and second stage satisfy well known "hunting teeth" and "sequence meshing" constraints. For "hunting teeth", the ratio ($N_S/N_P$) or the ration ($N_R/N_P$) is equal to a whole number plus an irreducible fraction. For "sequence meshing", the ratio ($N_R$/# of pinions) or the ratio ($N_S$/# of pinions) is equal to a whole number plus an irreducible fraction. Moreover, the number of pinions is selected to avoid interference therebetween by satisfying the following constraint:

$$\# \text{ of pinions} \leq \frac{\pi}{\arcsin\left[\frac{[dp+2a]}{ds+dp}\right]}$$

where dp is the pinion pitch diameter, ds is the sun gear pitch diameter and a is the addendum of the pinion.

Figure 4:
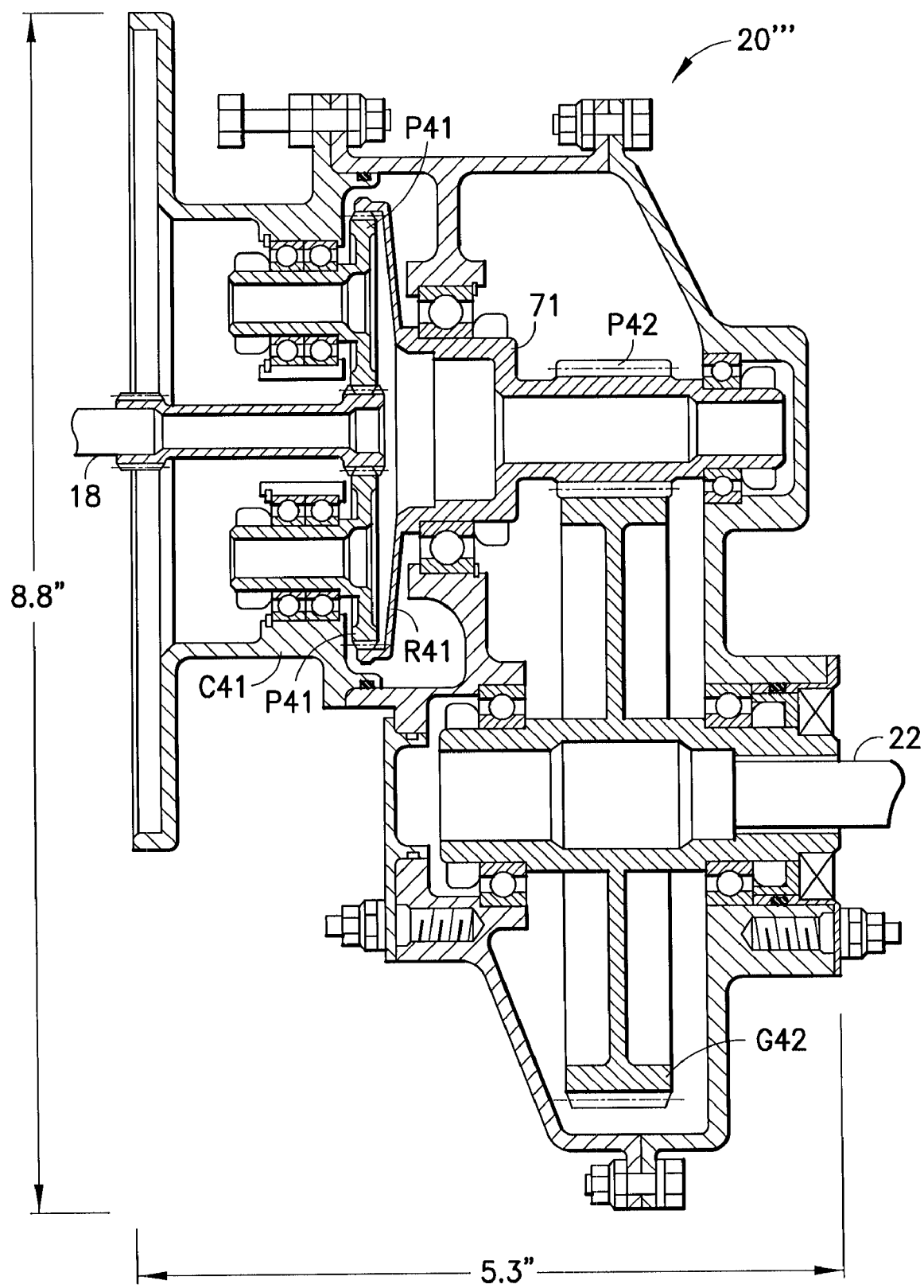
FIG. 4 is a cross-section depicting a third illustrative embodiment of the transmission system of FIG. 1A, which is realized by a two stage offset star-spur configuration.

FIG. 4 illustrates a third exemplary embodiment of the transmission system 20 of FIG. 1. The two-stage transmission system, which is labeled 20''', is an Offset Star-Spur configuration. The first stage is provided by a star planetary system having a sun gear S41, a plurality of planetary pinions P41, a fixed carrier C41 operably coupled to the planetary pinions P41, and an output ring gear R41. The second stage is provided by a spur pinion P42 and gear G42. The input shaft 18 is coupled to the sun gear S41 of the first stage. The output ring gear R41 of the first stage is integral to an intermediate shift 71 with the pinion P42 of the second reduction stage integral thereto. The gear G42 of the second stage is integral to a spline that is operably coupled to the output shaft 22 of the transmission system 20'''. The pinions P41 of the first stage, the intermediate shaft 71, and the spline of the gear G42 of the second stage are supported by bearings as shown.

The reduction ratio of the Offset Star-Spur configuration of FIG. 4 is provided by:

$$\frac{N_{R41}}{N_{S41}} \frac{N_{G42}}{N_{P42}},$$

where $N_{R41}$, $N_{S41}$, $N_{G42}$, $N_{P42}$ are the number of teeth along the pitch circle of the respective first stage ring gear R41, first sun gear S41, second stage pinion P42 and second stage gear G42.

In the exemplary configuration shown, the diameters $D_{S41}$, $D_{P41}$ and $D_{R41}$ of the first stage gears are 0.594 inches, 1,281 inches and 3.156 inches, respectively, and the teeth counts $N_{S41}$, $N_{P41}$, and $N_{R41}$ of the first stage gears are 19, 41, and 101, respectively. These values provide a reduction ratio of the first stage on the order of 5.3. Moreover, the diameters $D_{P42}$ and $D_{G42}$ of the second stage gears are 0.950 inches, 4.50 inches, respectively, and the teeth counts $N_{P42}$ and $N_{G42}$ of the second stage gears are 19 and 92, respectively. These values provide a reduction ratio of the second stage on the order of 4.8. The reduction ratio of the transmission system 20''' is the product of these two reduction values, which is (5.3*4.8):1 and thus on the order of 25:1. With the input shaft rotating at about 104,600 RPM with a power on the order of 70 HP, the intermediate shaft 71 is rotating at about 19,677 RPM, and the output shaft 22 is rotating at about 4,154 RPM, which is a value suitable for driving the propeller of a small propeller-driven fixed-wing UAV.

Note that the largest diameter of the configuration of FIG. 4 is formed by the second stage, which is dictated by the diameter of the second stage gear G42. In the configuration shown, this dimension is on the order of 6.5 inches in diameter. The housing requires a few additional inches in diameter, thus the largest diameter of the transmission system 20''' is on the order of 8.8 inches. The width of the transmission system 20''' is on the order of 5.3 inches as shown.

Note that it is desirable that the star planetary system of the first stage satisfy well known "hunting teeth" and "sequence meshing" constraints as described above. Moreover, the number of pinions is selected to avoid interference therebetween as described above.

Figure 5A:
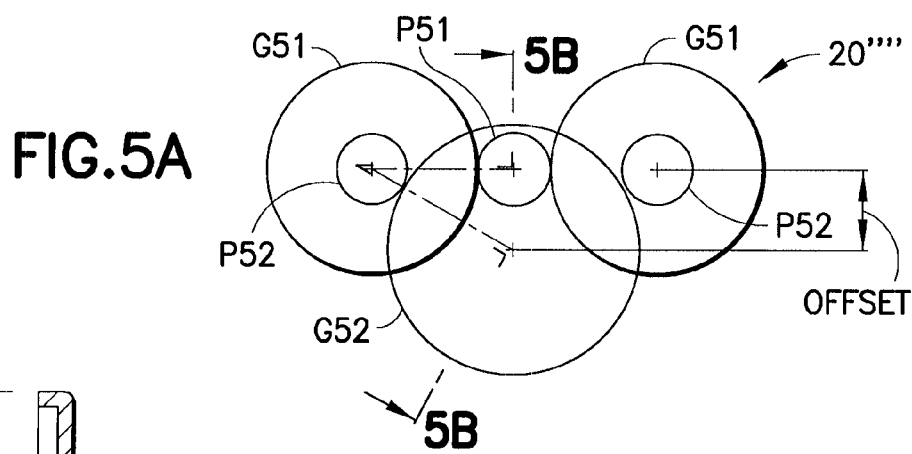
FIG. 5A is a schematic diagram depicting a fourth illustrative embodiment of the transmission system of FIG. 1A, which is realized by a two stage offset compound-idler configuration.
Figure 5B:
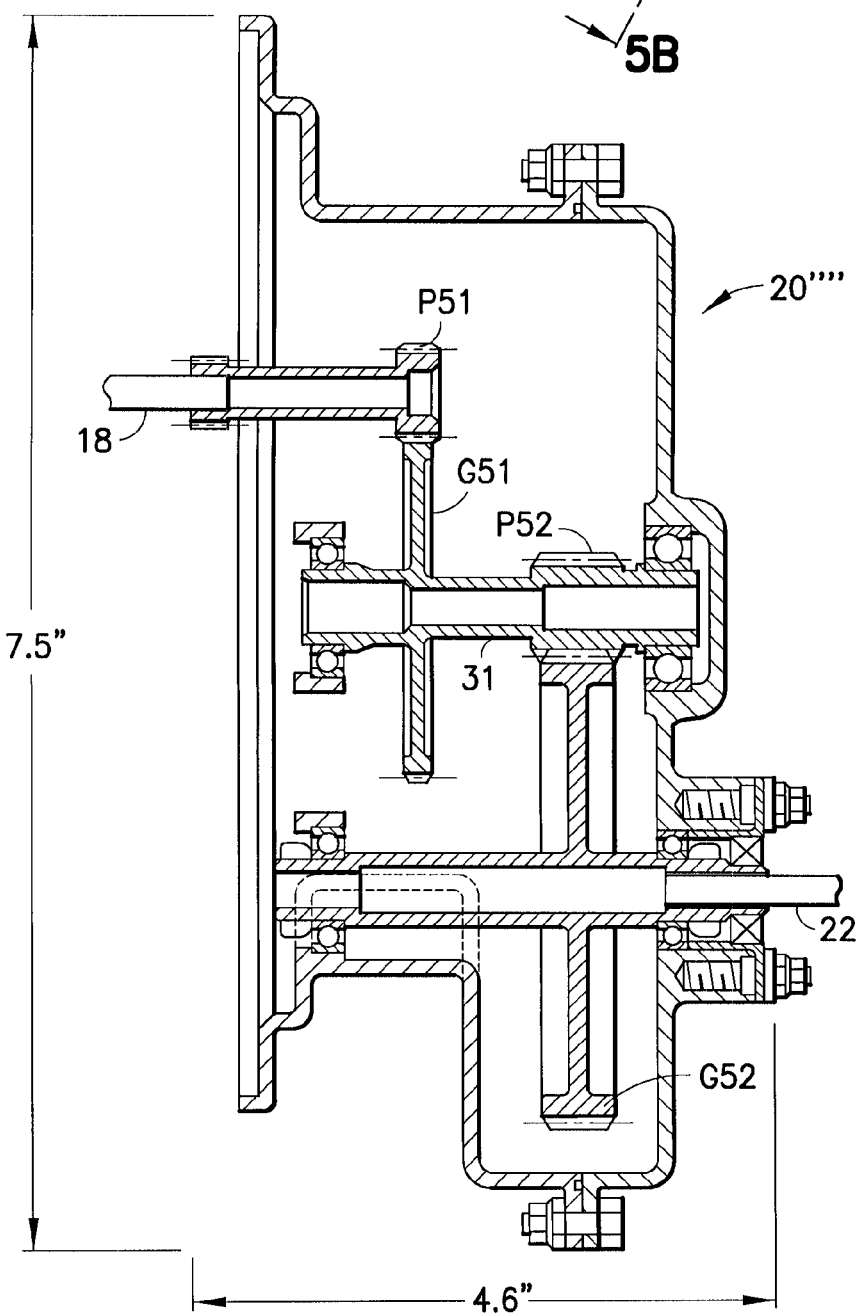
FIG. 5B is a cross-section depicting the compound-idler configuration of FIG. 5A.

FIGS. 5A and 5B illustrate a fourth exemplary embodiment of the transmission system 20 of FIG. 1. The two-stage transmission system, which is labeled 20'''', is an Offset Compound Idler configuration. The first stage includes a floating input pinion P51 driving two diametrically opposed gears G51. Each gear G51 is connected to a corresponding intermediate shaft 81 with a second stage pinion P52 that combines to drive a single output gear G52. This arrangement is very similar to the lay shaft arrangement described above with respect to FIG. 2, except that the output gear G52 of the second stage is offset from the input. This offset is possible geometrically because the center distance of the second stage is larger that the center distance of the first stage. The intermediate shafts for the two gears G51 and two pinions P52 (one shown as 81 in the cross section of FIG. 5B), and the spline coupled to the output shaft 22 are supported by bearings as shown.

The reduction ratio of the Offset Compound Idler configuration of FIG. 5 is provided by the same formulas as the Inline Lay Shaft configuration described above with respect to FIG. 2.

In the exemplary configuration shown, the diameters $D_{G51}$ and $D_{P51}$ are 2.767 inches and 0.60 inches, respectively, and the teeth counts $N_{G51}$ and $N_{P51}$ are 83 and 18, respectively. These values provide a reduction ratio of the first stage on the order of 4.6. Moreover, the diameters $D_{G52}$ and $D_{P52}$ are 4.020 inches and 0.741 inches, respectively, and the teeth counts $N_{G52}$ and $N_{P52}$ are 103 and 19, respectively. These values provide a reduction ratio of the second stage on the order of 5.4. The reduction ratio of the system 20'''' is the product of these two reduction values, which is (4.6*5.4):1 and thus on the order of 25:1. With the input shaft 18 rotating at about 104,600 RPM with a power on the order of 70 HP, the two intermediate shafts 81 are rotating at about 22,684 RPM, and the output shaft 22 is rotating at about 4,184 RPM, which is a value suitable for driving the propeller of a small propeller-driven fixed-wing UAV.

Note that the cross section of FIG. 5B is taken through the mesh path as noted in FIG. 5A This gives the appearance of a large assembly. But, in fact, the intermediate shafts are on the same centerline as the input pinion so that the overall height of the transmission system is on the order of 7.5 inches. The width of the transmission system is on the order of 4.6 inches as shown. It is expected that weight and costs of compound idler configuration of FIGS. 5A and 5B will be lower relative to the other configurations discussed herein. Thus, it is expected that the compound idler configuration will be advantageous for use in lightweight applications, such as in small fixed-wing propeller-driven UAVs.

Figure 6A:
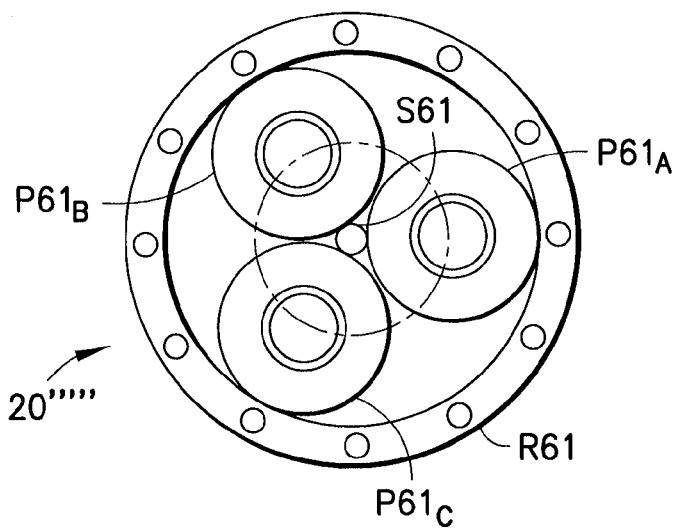
FIG. 6A is a schematic diagram depicting a fifth illustrative embodiment of the transmission system of FIG. 1A, which is realized by a two stage traction-internal gear configuration.
Figure 6B:
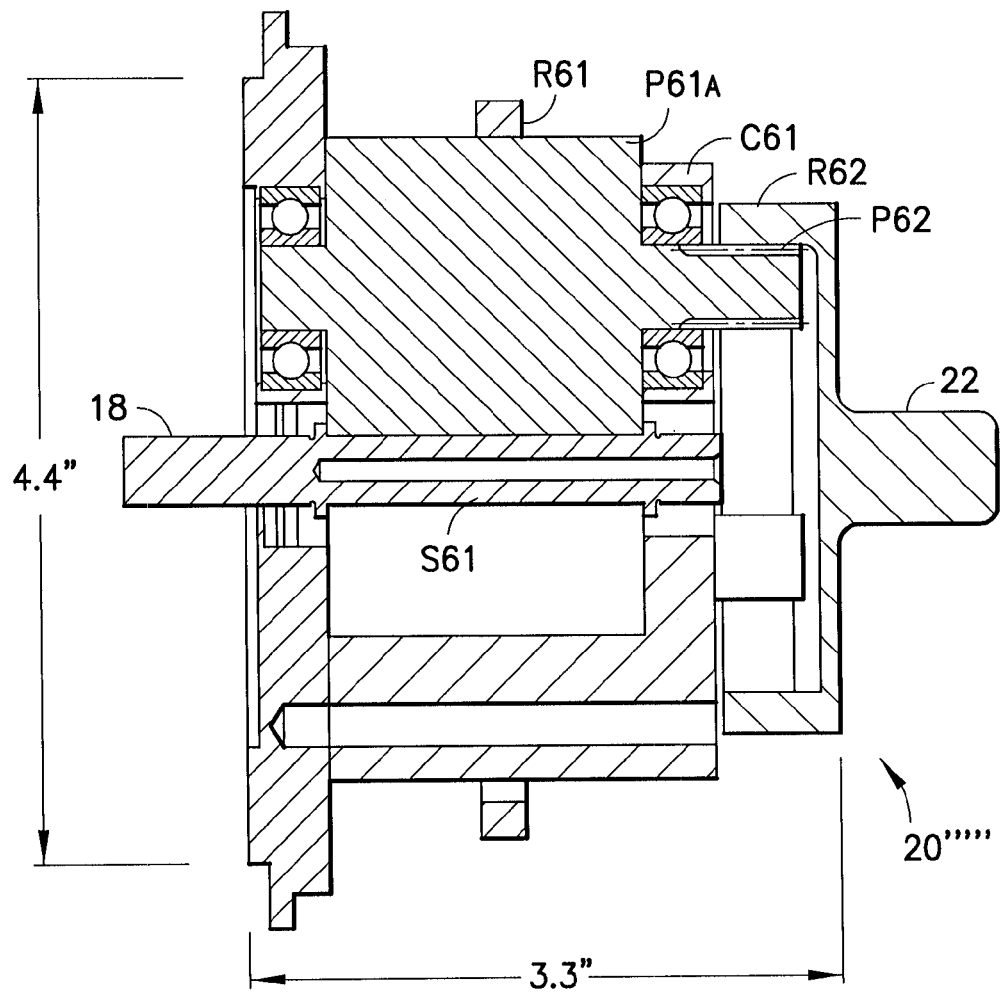
FIG. 6B is a cross-section depicting the traction-internal gear configuration of FIG. 6A.

FIGS. 6A and 6B illustrate a fifth exemplary embodiment of the transmission system 20 of FIG. 1. The two-stage transmission system, which is labeled 20''''', is an Inline Traction-Internal Gear configuration. The first stage is realized by a traction drive. A traction drive utilizes rollers (not a teeth mesh) to transfer energy. It works on the principle of creating a normal force between two rollers that can support a tangential load equal to the normal force times the traction coefficient. The traction coefficient is similar to the coefficient of friction. The traction drive is cooled and lubricated by specially developed traction fluids. The traction fluid, in combination with the rolling elements, acts like a spur gear, which has the benefit of a damping effect on the transmission. The shearing force of an elasto-hydrodynamic lubrication oil film between the two rotating surfaces achieves traction drive. An automatic speed/load adjustment device obtains high efficiency by providing the correct amount of radial force to permit drive. The radial force automatically adjusts the torque required. The traction drive is typically lower in cost than a geared reduction stage because it avoids the costs of a teeth mesh.

As shown in FIG. 6A, two of the three pinions (labeled $P61_A$, $P61_B$) of the traction stage are fixed in position and one of the three pinions (labeled $P61_C$) is loose by a small amount of space (for example, 0.0031 inches). The center of the position of the loose pinion $P61_C$ on the carrier is offset in a critical direction such that when torque is applied to the traction sun S61, the loose pinion $P61_C$ attempts to move away from its position at rest and the contact line between the inside roller and the post will move away from the centerline between the traction sun S61 and the loose post member. This creates a larger normal force and preloads all three pinion rollers $P61_A$, $P61_B$, $P61_C$. The adjustment varies with torque such that the correct amount of normal force is provided to transmit the applied torque. As torque increases, the loose roller $P61_C$ automatically adjusts to a new position and provides the correct new normal force required.

In the configuration shown, there is a traction ring R61. But, its only purpose is to provide a radial load reaction member and thus it merely spins along without torque. The three traction pinions $P61_A$, $P61_B$, $P61_C$ are attached to a carrier C61 through bearings such that they can rotate about there own centers, and the carrier C61 is fixed in position. Integral to each traction pinion is an external spur pinion P62 (one shown in the cross-section of FIG. 6B). The three external pinions P62 drive an output internal ring gear R62 that drives the output shaft 22. The three external pinions P62 and the output internal ring gear R62 provide the second stage of the transmission system 20''''.

The reduction ratio of the Inline Traction-Internal Gear configuration of FIGS. 6A and 6B is provided by:

$$\frac{D_{P61}}{D_{S61}} \frac{D_{R62}}{D_{P62}},$$

where $D_{P61}$ and $D_{S61}$, are the diameters of the roller for the teeth of the respective pinions P61 and sun D61 of the first stage traction drive, and $D_{R62}$ and $D_{P62}$ are the diameters of the pitch circle for the teeth of the respective ring gear R62 and pinions P62 for the second stage.

Alternatively, the reduction ratio of the Inline Traction-Internal Gear configuration of FIGS. 6A and 6B is provided by:

$$\frac{D_{P61}}{D_{S61}} \frac{N_{R62}}{N_{P62}},$$

where $D_{P61}$ and $D_{S61}$, are the diameters of the roller for the teeth of the respective pinions P61 and sun S61 of the first stage traction drive, and $N_{R62}$ and $N_{P62}$ are the number of teeth of the pitch circle for the respective ring gear R62 and pinions P62 for the second stage.

In the exemplary configuration shown, the diameters $D_{P61}$ and $D_{S61}$ are 1.680 inches and 0.40 inches, respectively. These values provide a reduction ratio of the first stage traction unit on the order of 4. Moreover, the diameters $D_{R62}$ and $D_{P62}$ are 2.50 inches and 0.421 inches, respectively, and the teeth counts $N_{R62}$ and $N_{P62}$ are 95 and 16, respectively. These values provide a reduction ratio of the second stage on the order of 5.9. The reduction ratio of the transmission system is the product of these two reduction values, which is (4*5.9):1 and thus on the order of 24:1. With the input shaft 18 rotating at about 104,600 RPM with a power on the order of 70 HP, the pinions P61 are rotating at about 24,905 RPM, and the output shaft 22 is rotating at about 4,195 RPM, which is a value suitable for driving the propeller of a small propeller-driven fixed-wing UAV.

Note that the overall height of the transmission system is on the order of 4.4 inches. The width of the transmission system is on the order of 3.3 inches as shown.

Figure 7:
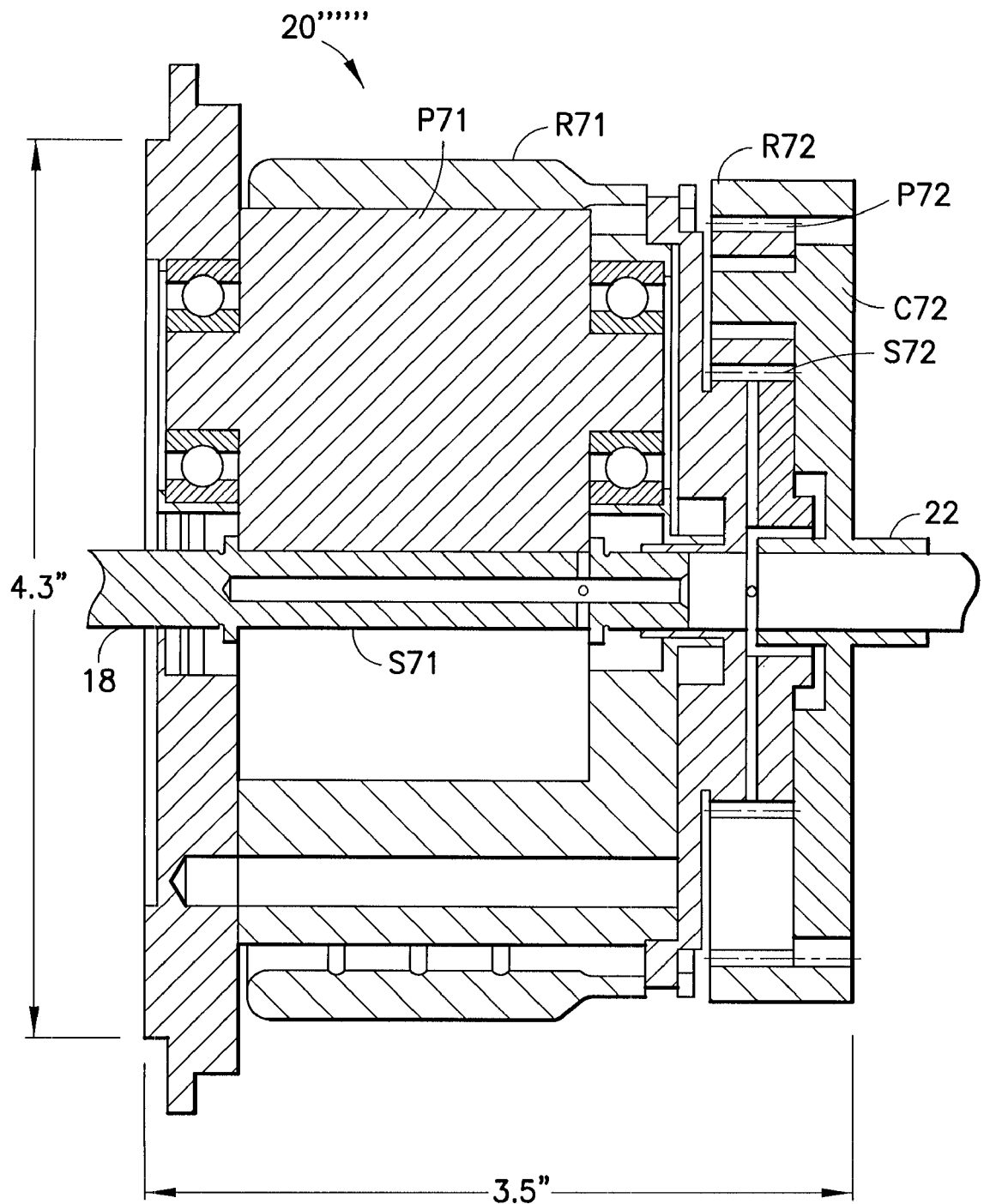
FIG. 7 is a cross-section depicting a sixth illustrative embodiment of the transmission system of FIG. 1A, which is realized by a two stage traction-planetary gear configuration.

FIG. 7 illustrates a sixth exemplary embodiment of the transmission system 20 of FIG. 1. The two-stage transmission system, which is labeled 20''''', is an Inline Traction-Planetary Gear configuration. The first stage is realized by a traction drive stage as described above with respect to FIGS. 6A and 6B, and the second stage is provided by a star planetary system having a sun gear S72, a fixed ring gear R72, and a plurality of planetary pinions P72 operably coupled to a rotating carrier C72 that drives the output shaft 22 of the transmission system. In this configuration, the traction ring R71 of the first stage is used to drive the sun gear S72 of the second stage.

The reduction ratio of the Inline Traction-Planetary Gear configuration of FIG. 7 is provided by:

$$\frac{D_{R71}}{D_{S71}}\left(1 + \frac{D_{R72}}{D_{S72}}\right),$$

where $D_{R71}$ and $D_{S71}$, are the diameters of the roller for the teeth of the respective ring R71 and sun S71 of the first stage traction drive, and $D_{R72}$ and $D_{S72}$ are the diameters of the pitch circle for the teeth of the respective ring gear R72 and sun gear S72 for the second stage.

Alternatively, the reduction ratio of the Inline Traction-Internal Gear configuration of FIGS. 6A and 6B is provided by:

$$\frac{D_{R71}}{D_{S71}}\left(1 + \frac{N_{R72}}{N_{S72}}\right)$$

where $D_{R71}$ and $D_{S71}$, are the diameters of the roller for the respective ring R71 and sun S71 of the first stage traction drive, and $N_{P72}$ and $N_{S72}$ are the number of teeth of the pitch circle for the respective ring gear R72 and sun gear S72 for the second stage.

In the exemplary configuration shown, the diameters $D_{R71}$ and $D_{S71}$ are 3.775 inches and 0.675 inches, respectively. These values provide a reduction ratio of the first stage traction unit on the order of 5.6. Moreover, the diameters $D_{R72}$ and $D_{S72}$ are 3.64 inches and 1.16 inches, respectively, and the teeth counts $N_{R72}$ and $N_{S72}$ are 91 and 29, respectively. These values provide a reduction ratio of the second stage on the order of 4.1 The reduction ratio of the transmission system is the product of these two reduction values, which is (5.6*4.1):1 and thus on the order of 23:1. With the input shaft 18 rotating at about 104,600 RPM, the first stage ring R1 is rotating at about 17,318 RPM, and the output shaft 22 is rotating at about 4,185 RPM, which is a value suitable for driving a propeller of a small propeller-driven fixed-wing UAV.

Note that the overall height of the transmission system 20''''' is on the order of 4.3 inches, and the width of the transmission system is on the order of 3.5 inches as shown.

Figure 8B:
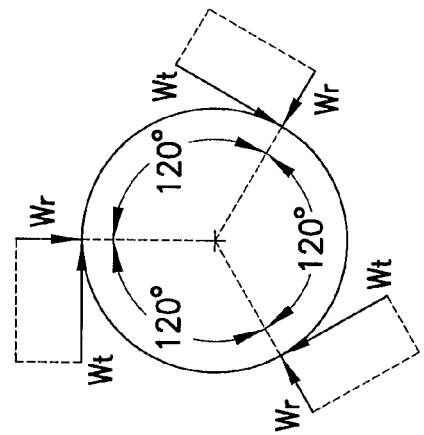
FIGS. 8A and 8B are schematic diagrams illustrating the principles of a self-equilibrating reduction stage.
Figure 8A:
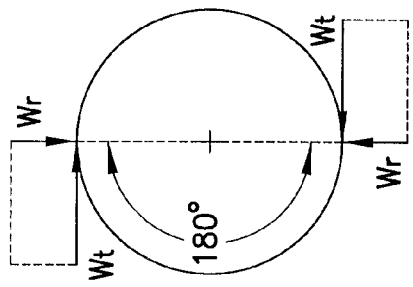

Another consideration for the design of the transmission system of the present invention is the high speed operation of the input shaft 18. Designing bearings to operate at such high speeds in challenging. However, it is very difficult to designs bearings suitable for use with radial and/or thrust loads at such high speeds. Thus, it is an objective to have the input shaft of the transmission carry only torque and haw no radial or thrust loads (and if possible have no bearings). In order to reduce the radial and thrust loads on the input shaft of the transmission, it is preferable that the first reduction stage of the transmission system provide for self-equilibration. This condition is provided by equally spacing apart the gear or roller outputs from a given pinion such that the resultant load on the pinion is cancelled out. FIGS. 8A and 8B illustrates the physics provided by a self-equilibrating configuration. For example, consider the two gear system of FIG. 8A. Suppose the tangential tooth load on the upper gear is higher than on the lower gear. The radial tooth loads are the resultant of the tangential tooth loads; therefore, the radial tooth load on the upper gear will also be higher than on the lower. This difference in load will force the pinion into mesh on the lighter load side (e.g., lower gear side) until the loads are exactly balanced. Hence, if the pinion is permitted to "float" such that is trapped by equally spaced surrounding gears or rollers, the loads are equalized resulting in the desired cancellation. In this configuration, the input drive shaft 18 of the transmission system need not be supported by high bearings, thereby eliminating the requirement of loaded bearings at high speeds.

Also note that when a planetary system is used in the first stage of the transmission system 20, it should be realized with a fixed carrier. This is necessary to avoid centrifugal forces acting on the pinions of a rotating carrier, which can substantially reduce bearing life.

Figure 9:
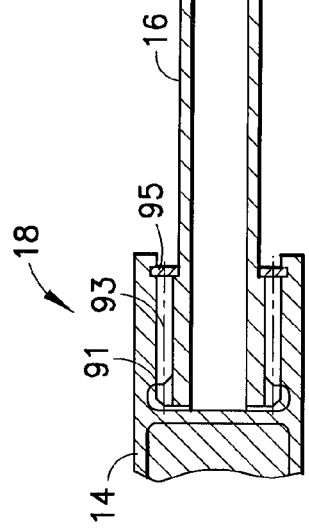
FIG. 9 is a cross-section illustrating an outside diameter piloted spline coupling mechanism that couples the output shaft of the microturbine engine to the input shaft of the transmission system in accordance with the present invention.

Preferably, the input shaft 18 of the transmission system 20 is coupled to the output shaft 14 of the microturbine 12 via an outside diameter piloted spline coupling mechanism (sometimes referred to as a "flat root major diameter fit spline coupler") as shown in FIG. 9. In this configuration, the input shaft 16 of the transmission system includes an outside diameter piloted spline section 91. The output shaft 14 of the microturbine 12 includes projections 93 that project radially inward from the inner diameter surface to engage the piloted section 91. A snap ring 95 or other suitable retention mechanism is used to retain the input shaft 95 in the horizontal direction as shown. Alternatively, the external spline surface can be provided on the output shaft 14 of the microturbine engine 12 with an internal spline surface provided on the input shaft 16 of the transmission system.

An accessory unit may be operably coupled to the drive train of the transmission system. For example, the accessory unit may be a starter/generator having a brushless 4-pole permanent magnet AC type architecture with a plurality (e.g., 4) magnets mounted around a rotor perimeter. A power control unit converts the alternating current output to direct current output in generating mode, and converts the direct current input to alternating current input in starting mode. The accessory unit can be coupled to the drive train of the transmission system in many ways.

For example, the accessory can be directly mounted on the input shaft of the transmission system (or the output shaft of the microturbine engine). This configuration may be problematic in designs that rely on a floating input shaft for the purposes of self-equilibrating load sharing and radial load cancellation as described above due to the weight and any imbalance of the accessory on the input shaft of the transmission system. On the other hand, for a design where a traction-type drive is used in the first stage of the transmission systems the accessory mounted onto transmission input shaft will have very little influence on load sharing due to the fact that the radial loads of the traction drive are greater than ten times the tangential loads, and the three equally spaced traction pinions rigidly hold the traction sun in place. The radial rigidity of the traction sun can easily handle any influence of the accessory mounted on the input shaft.

Alternatively, the accessory unit may be mounted on a separate mounting pad and driven by the drive train of the transmission system. For example, consider the Offset Compound Idler configuration of FIGS. 5A and 5B. In this configuration, a pinion may be integral to the rotating shaft of the accessory unit and driven by an idler gear meshed to one of the gears G1 of the first stage. Preferably, the number of teeth of the pinion that is integral to the rotating shaft of the accessory unit is equal to the number of teeth of the pinion P1 of the first stage to enable the rotating shaft of the accessory unit to be driven at the same rotational speed as the input shaft 18 of the transmission system 20. Moreover, the idler gear provides clearance between the accessory mount and the stage(s) of the transmission system.

The transmission system also requires a lubrication system. Preferably, the lubrication system includes a conventional oil filter and pump system. The oil pump may be a vane-type pump, gear pump, or a Gerotor pump, which are all well known. In addition, the lubrication system preferably includes an oil cooler device as is well known. In the event that the oil type, temperature and pressure requirements of the engine and transmission system are similar, the lubrication system of the transmission system may be combined with the lubrication system of the engine as is well known.

Figure 10:
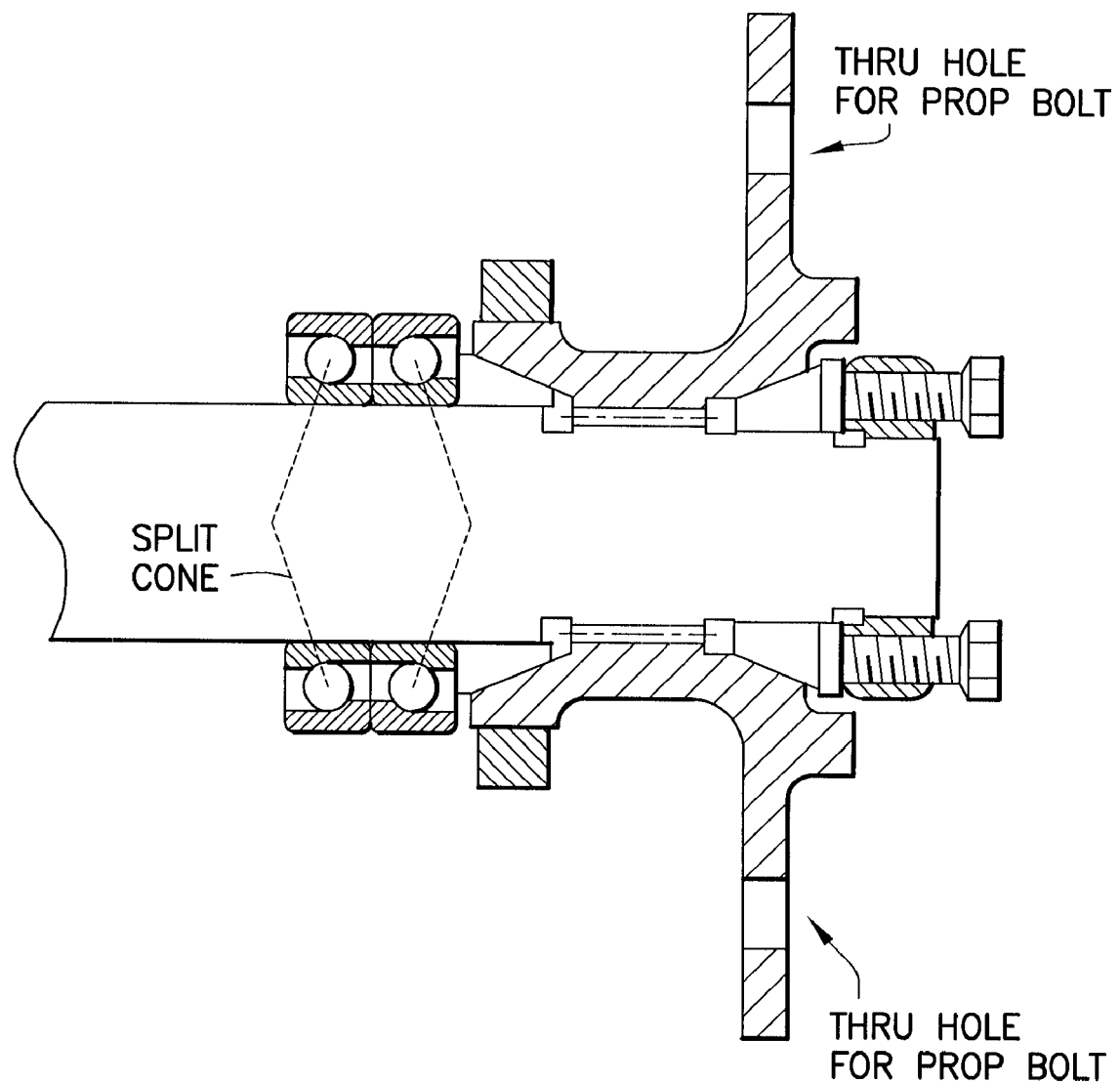
FIG. 10 is a cross-section illustrating a coupling mechanism that couples the output shaft of the transmission system to a propeller for a fixed-wing propeller-driven UAV.

For fixed-wing applications, the output shaft of the transmission system is coupled to a propeller. The gyroscopic moment induced by the expected pitch rate and yaw rate and mass moment of inertia of the propeller dictates the size of the output shaft of the transmission system. An exemplary mechanism for coupling the output shaft of the transmission system to a propeller is shown in FIG. 10. Note that the coupling mechanism may be integrated into the housing of the transmission system for a compact design.

Figure 11A:
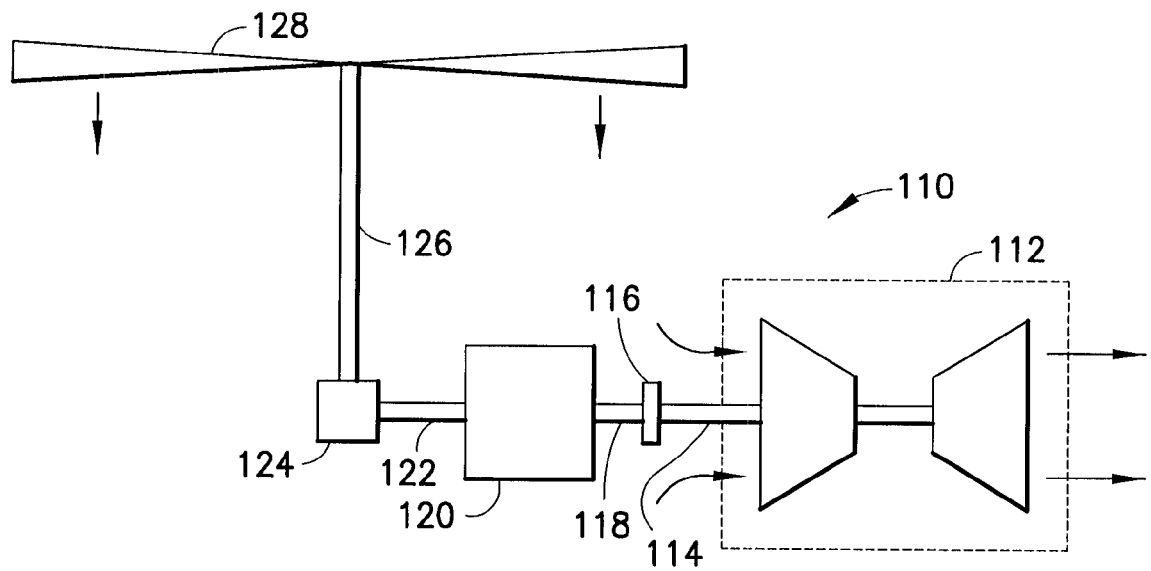
FIG. 11A is a schematic diagram of a rotor-based propulsion system, including a microturbine engine and transmission system in accordance with the present invention.
Figure 11B:
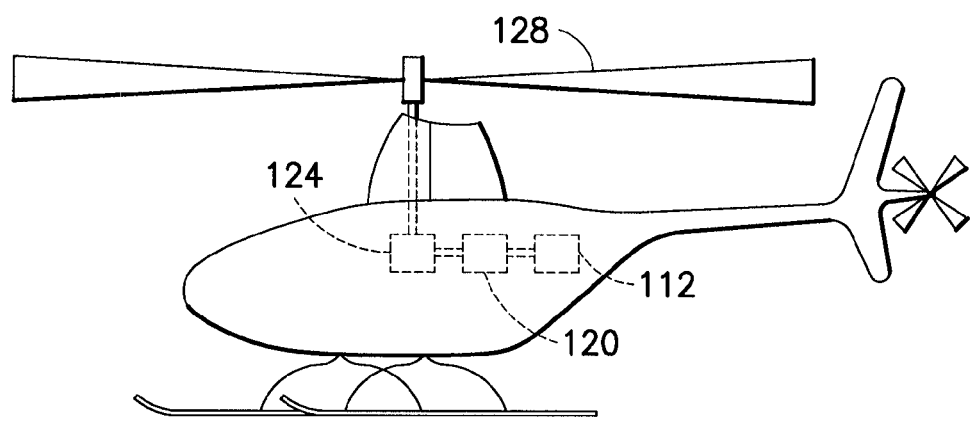
FIG. 11B is a pictorial illustration of an exemplary vertical lift UAV that employs the rotor-based propulsion system of FIG. 11A in accordance with the present invention.

The exemplary embodiments of the transmission system (and microturbine-based propulsion system employing such transmission systems) described above are suitable for use in small fixed-wing aircraft applications such as small UAVs. The transmission systems (and microturbine-based propulsion system employing such transmission systems) can also be readily adapted for use in other aircraft applications, such as in small vertical lift aircraft applications as shown in FIG. 11A. In such applications, a power plant 110 suitable for use in propelling a vertical-lift aircraft includes a microturbine engine 112 with an output shaft 114. A coupling mechanism 116 couples the output shaft 114 to the input shaft 118 of a transmission system 120. The transmission system 120 operates to reduce the speed of the output shaft 114 of the microturbine engine 112 at its own output shaft 122. The output shaft 122 of the transmission system 120 is coupled to a bevel gear assembly 124 or other suitable drive mechanism that transmits the power of the rotating shaft 122 to a rotating vertical shaft 126. A rotor 128 is coupled to the rotating vertical shaft 126. The rotor 128, when driven by the microturbine engine 112 and transmission system 120, provides thrust that propels an aircraft body, such as the body of the vertical lift aircraft 130 of FIG. 11B. Note that in the configuration shown, the transmission system 120 and bevel gear assembly 124 are disposed on the intake side of the microturbine engine 112. This configuration allows the transmission system 120 and bevel gear assembly 124 to be cooled by the engine inlet air. Alternatively, the transmission system 120 and bevel gear assembly 124 may be disposed on the exhaust side of the microturbine engine 112. In this alternate configuration, the transmission system 120 and bevel gear assembly 124 must operate in a hot environment, and thus must be designed to endure the increased thermal loading that stems from operation in the hot environment on the exhaust side of the engine 112.

The output shaft 114 of the microturbine 112 operates at very high rotational speeds, typically in the range between 72,000 RPM and 150,000 RPM with an output power between 150 HP and 5 HP. For UAV applications, the rotor 128 operates at much slower rotational speeds, typically on the order of 3700 RPM to 4500 RPM. These constraints result in a required reduction ratio from the microturbine engine RPM to the rotor RPM on the order of 28:1 to 24:1. The transmission system 120 and the bevel gear assembly 124 provide this required speed reduction over the output power range (150 HP to 5 HP) of the microturbine engine.

In the preferred embodiment of the present invention, the transmission system 120 as well as the microturbine engine 112 is of small size and low weight. Preferably, the maximum diameter of the transmission system 120 is less than 12 inches. Such size and weight constraints are suitable for use in advanced UAVs.

Moreover, the transmission system 120 may be realized by a two-stage design. There are many different two-stage designs that can be used to realize the transmission system 120 as described above with respect to FIGS. 2-8. Note that the bevel gear assembly 124 will typically provide a reduction ratio on the order of 2:1 to 3:1. Therefore, the reduction ratio of the two stage transmission designs of FIGS. 2-8 as described above are readily adapted to provide for a lower reduction ratio (e.g., on the order of 9:1) to provide a total reduction ratio on the order of 28:1 to 24:1. Preferably, the reduction ratio of each stage of the two-stage transmission designs of FIGS. 2-8 are on the order of 3:1.

Note that for the traction drive designs of FIGS. 6A-6B and 7, the first stage traction planetary can be readily adapted to provide any reduction ratio up to 13:1 in the single traction stage. Thus, for vertical lift applications, the second geared planetary stage may be completely eliminated, thereby providing for significant cost advantages.

There have been described and illustrated herein several embodiments of a small-size high-speed transmission system and microturbine-based propulsion systems utilizing the improved transmission system. While particular embodiments of the invention have been described, it is not intended that the invention be limited thereto, as it is intended that the invention be as broad in scope as the art will allow and that the specification be read likewise. Thus, while particular shaft speeds, horsepowers and reduction ratios have been disclosed, it will be appreciated that the transmission systems described herein can be readily adapted for use in a broad range of shaft speeds, horsepowers and reduction ratios. For example, the transmission systems described herein may be readily adapted for use with microturbines that operate in an extended range between 50,000 RPM and 200,000 RPM with an output power between 200 HP and 5 HP. In these systems, the reduction ratio provided by the transmission system will likely be increased for certain applications, such as the UAV applications described herein. In addition, while particular types of transmission stages have been disclosed, it will be understood that other well know transmission stage designs can be used. For example, and not by way of limitation, the transmission system can be realized by a harmonic drive stage. The harmonic drive includes three basis elements (a circular spline, a flexspline, and a wave generator) that utilize non-circular rotation of the flexspline to drive the circular spline. Also, while the transmission system and microturbine-based propulsion system of the present invention are preferably used in conjunction with a propeller to propel a small-size fixed-wing aircraft, it will be appreciated that it will be readily adapted for other small-size aircraft applications, such as vertical-lift aircraft or hybrid tilt-rotor aircraft. Moreover, the transmission system and microturbine-based propulsion system of the present invention may be readily adapted for use in other applications, such as marine propulsion systems, automotive applications, electrical power generations applications, micro-turbine based HVAC applications and hydraulic applications. Finally, while microturbine-based propulsion systems of the present invention may consume a wide variety of fuels, including liquid fuels (such as liquefied natural gas) or gaseous fuels (such as natural gas or propane). It will therefore be appreciated by those skilled in the art that yet other modifications could be made to the provided invention without deviating from its spirit and scope as claimed.

What is claimed is:

1. A transmission system for use with a microturbine engine, the transmission system comprising:
    a bearingless floating input member operably coupled to rotational output of the microturbine engine, the bearingless floating input member rotating about a first rotational axis, the bearingless floating input member including a first shaft and an input pinion gear integral thereto;
    a first reduction stage comprising a plurality of self-equilibrating gears that mesh to said input pinion gear and that drive a plurality of intermediate shafts, the plurality of intermediate shafts rotating about fixed rotational axes that are offset relative to said first rotational axis; and
    a second reduction stage comprising a plurality of pinion gears that are affixed to said plurality of intermediate shafts and that mesh to an output gear that is integral to an output shaft, the output shaft rotating about a fixed rotational axis that is offset relative to said first rotational axis;
    wherein said first and second reduction stages cooperate to drive the output shaft at a reduced rotational speed relative to the rotational output of the microturbine engine; and
    wherein said bearingless floating input member is not directly supported by bearings and floats such that radial and thrust loads applied thereto are effectively cancelled by the self-equilibrating gears of the first stage.

2. A transmission system according to claim 1, wherein:
    said bearingless input member rotates about said first rotational axis at a rotational speed greater than 72,000 RPM.

3. A transmission system according to claim 1, wherein:
    said bearingless input member rotates about said first rotational axis at a rotational speed in a range between 72,000 RPM and 150,000 RPM.

4. A transmission system according to claim 3, wherein:
    the bearingless input member rotates about the first rotational axis with an output power between 150 HP and 5 HP.

5. A transmission system according to claim 1, wherein:
    said second reduction stage provides a reduction ratio greater than said first reduction stage.

6. A transmission system according to claim 5, wherein:
    said first and second reduction stages provide a reduction ratio having a value of at least 19.

7. A transmission system according to claim 6, wherein:
    said reduction ratio has a value greater than 24.

8. A transmission system according to claim 1, wherein:
    largest diameter of said transmission system is less than twelve inches.

9. A transmission system according to claim 1, wherein:
    said output shaft is operably coupled to a rotating element for propelling an aircraft body.

10. A transmission system according to claim 9, wherein:
    said aircraft body comprises a fixed-wing aircraft body, and said rotating element comprises a propeller.

11. A transmission system according to claim 9, wherein:
    said aircraft body comprises a vertical-lift aircraft body, and said rotating element comprises a rotor.

12. A transmission system according to claim 1, wherein:
    an outside diameter piloted spline coupling mechanism couples said first shaft to the rotational output of the microturbine engine.

13. A transmission system according to claim 12, wherein:
an outside diameter section of said first shaft includes a plurality of pilot grooves that engage projections that extend radially downward from a corresponding inside diameter section of the rotational output of the microturbine engine.

14. A transmission system according to claim 1, further comprising:
an idler gear that meshes to one of said self-equilibrating gears, said idler gear providing an interface to an accessory unit.

15. A propulsion system for an aircraft comprising:
a microturbine engine; and
a transmission system according to claim 1.

16. A propulsion system according to claim 15, wherein:
said output shaft of said transmission system is operably coupled to a rotating element for propelling an aircraft body.

17. A propulsion system according to claim 16, wherein:
said aircraft body comprises a fixed-wing aircraft body, and said rotating element comprises a propeller.

18. A propulsion system according to claim 16, wherein:
said aircraft body comprises a vertical-lift aircraft body, and said rotating element comprises a rotor.

19. An aircraft comprising:
an aircraft body;
the propulsion system of claim 15; and
a rotating element, operably coupled to said propulsion system for propelling said aircraft body.

20. An aircraft according to claim 19, wherein:
said aircraft body comprises a vertical-lift aircraft body, and said rotating element comprises a rotor.

21. An aircraft according to claim 19, wherein:
said aircraft body comprises a fixed-wing aircraft body, and said rotating element comprises a propeller.

22. A transmission system according to claim 1, further comprising:
coupling means for detachably coupling the bearingless floating input member to rotational output of the microturbine engine.

* * * * *